United States Patent
Chari et al.

(10) Patent No.: US 11,159,547 B2
(45) Date of Patent: Oct. 26, 2021

(54) MALWARE CLUSTERING APPROACHES BASED ON COGNITIVE COMPUTING TECHNIQUES

(71) Applicant: International Business Machines Corporation, Armonk, NY (US)

(72) Inventors: Suresh Chari, Westchester, NY (US); Heqing Huang, Mahwah, NJ (US); Taesung Lee, White Plains, NY (US); Youngja Park, Princeton, NJ (US)

(73) Assignee: International Business Machines Corporation, Armonk, NY (US)

( * ) Notice: Subject to any disclaimer, the term of this patent is extended or adjusted under 35 U.S.C. 154(b) by 61 days.

(21) Appl. No.: 15/668,051

(22) Filed: Aug. 3, 2017

(65) Prior Publication Data
US 2019/0044964 A1 Feb. 7, 2019

(51) Int. Cl.
*G06F 21/60* (2013.01)
*H04L 29/06* (2006.01)
*G06N 20/00* (2019.01)
*G06F 21/55* (2013.01)

(52) U.S. Cl.
CPC ........ *H04L 63/1425* (2013.01); *G06F 21/552* (2013.01); *G06N 20/00* (2019.01); *H04L 63/145* (2013.01)

(58) Field of Classification Search
CPC ........... H04L 63/14; H04I 63/08; G06N 20/00
See application file for complete search history.

(56) References Cited

U.S. PATENT DOCUMENTS

| 8,561,193 | B1* | 10/2013 | Srivastava ............ G06F 21/563 713/152 |
| 9,483,742 | B1* | 11/2016 | Ahmed ............... H04L 63/1441 |
| 2011/0179487 | A1* | 7/2011 | Lee ..................... H04L 63/1491 726/23 |
| 2013/0097706 | A1 | 4/2013 | Titonis et al. |
| 2013/0104230 | A1 | 4/2013 | Tang et al. |
| 2017/0251003 | A1* | 8/2017 | Rostami-Hesarsorkh ................... H04L 63/1425 |

OTHER PUBLICATIONS

Weiwei Zhuang, "Ensemble Clustering for Internet Security Applications", 2012, pp. 1-13 (Year: 2012).*

(Continued)

*Primary Examiner* — Wasika Nipa
(74) *Attorney, Agent, or Firm* — Harrington & Smith

(57) ABSTRACT

A computer system extracts features of documents that mention malware programs to determine textual features that correspond to individual ones of the malware programs. The computer system performs analysis of samples of malware programs to determine features corresponding to the samples. The computer system performs clustering using the textual features and using the features that correspond to the samples of the malware programs. The clustering creates clusters of data points, each data point corresponding to an individual one of the malware programs. The clusters contain data points considered by the clustering to be similar. The computer system outputs indications of the clusters to allow determination of whether data points in the clusters correspond to individual ones of specific malwares. Apparatus, methods, and computer program products are disclosed.

11 Claims, 6 Drawing Sheets

(56) References Cited

OTHER PUBLICATIONS

Cheng Wang, "A malware variants detection methodology with an opcode based feature method and a fast density based clustering algorithm", 2016, 481-487 (Year: 2016).*

Jialu Liu, et al., "Multi-View Clustering via Joint Nonnegative Matrix Factorization", Proc. of 2013 SIAM Data Mining Conf. (SDM'13), Austin, TX, May 2013.

Tomas Mikolov et al., "Efficient Estimation of Word Representations in Vector Space", arXiv:1301.3781v3 [cs.CL] Sep. 7, 2013.

Ngiam, Jiquan, et al. "Multimodal deep learning". Proceedings of the 28th international conference on machine learning (ICML-11). 2011.

Steffen Bickel and Tobias Scheffer, "Multi-View Clustering", Proceedings of the IEEE International Conference on Data Mining (2004).

* cited by examiner

MALWARE CLUSTERING APPROACHES BASED ON COGNITIVE COMPUTING TECHNIQUES

BACKGROUND

This invention relates generally to malware and, more specifically, relates to malware clustering techniques.

Malware is a term that is a shortened version of the phrase "malicious software". Malware is any software program designed to do damage to, or perform other unwanted actions using, an electronic device including a computer, a tablet PC (personal computer), and a smartphone. For instance, malware may not do harm on a machine itself, but simply leverage the machine to perform unwanted actions, including connecting to a website unwittingly for a distributed denial-of-service (DDOS) attack, asking for user credentials, or stealing confidential documents.

Malware has become increasingly important, as the cost of worldwide attacks by malware is estimated to be in the billions of dollars. Consequently, companies have been analyzing software to determine if the software is potentially malware. Many of these techniques use clustering, to determine whether software has features corresponding to known malware. The clustering allows malware to be identified, as programs that might be malware can be placed in a cluster also containing a known malware program. The programs that are clustered as such can be identified as variants of the known malware program. Such identification might take additional analysis to confirm whether the programs are variants, however, due to potential inaccuracies in the clustering.

For instance, traditional malware clustering is usually not very accurate, and a lot of mis-clustering happens when the malware clustering features are, e.g., extracted from obfuscated or packed malware, or when the malware is not fully executed during the automated dynamic malware analysis. Malware might be obfuscated by transforming the code in the malware, e.g., to change syntax while maintaining code flow. Packing may be performed by a packer, such as UPX for Windows (an operating system for computers by Microsoft), or by encrypting and/or compressing the malware. All of this leads to decreased accuracy in clustering.

One type of clustering used for malware clustering is dynamic malware clustering. This clustering creates features extracted based on runtime behavior, such as call traces, call stacks, and executed instruction opcode sequences. This approach is not scalable, however, and as such could not be applied on millions of malware samples. Also, there is a lack of runtime code coverage, as the malware sample is usually executed for a certain period, and it is hard to guarantee complete behavior coverage. Furthermore, this approach needs to trigger different behavior by adding environmental details (e.g., a specific program and configuration), and the added environmental details may not trigger the behavior that triggers operation of the malware. For instance, the features extracted from the same malware sample can be quite a bit different when execution of the malware sample is different.

Another type of clustering that is commonly used is static analysis clustering. The features are extracted from disassembled code, such as a control flow graph, a call graph, a data dependency graph, and the like. This approach is not accurate enough, particularly due to the obfuscation and packing other errors that occur during disassembly, which were described above. This approach also cannot reveal features in the dynamically linked code section and libraries, such as DLL (dynamic linked library) for Windows or Extra Dex or APK binaries for the Android OS (operating system).

SUMMARY

This section contains examples, and is not meant to be limiting.

In an exemplary embodiment, a method includes extracting by a computer system features of documents that mention malware programs to determine textual features that correspond to individual ones of the malware programs. The method includes performing by the computer system analysis of samples of malware programs to determine features corresponding to the samples. The method further includes performing by the computer system clustering using the textual features and using the features that correspond to the samples of the malware programs. The clustering creates clusters of data points, each data point corresponding to an individual one of the malware programs. The clusters contain data points considered by the clustering to be similar. The method additionally includes outputting by the computer system indications of the clusters to allow determination of whether data points in the clusters correspond to individual ones of specific malwares.

In another exemplary embodiment, a computer system comprises one or more memories storing computer-readable code and one or more processors. The one or more processors, in response to retrieval and execution of the computer-readable code, cause the computer system to perform operations comprising extracting by the computer system features of documents that mention malware programs to determine textual features that correspond to individual ones of the malware programs, and performing by the computer system analysis of samples of malware programs to determine features corresponding to the samples. The operations also comprise performing by the computer system clustering using the textual features and using the features that correspond to the samples of the malware programs, the clustering creating clusters of data points, each data point corresponding to an individual one of the malware programs, and the clusters containing data points considered by the clustering to be similar. The operations further comprise outputting by the computer system indications of the clusters to allow determination of whether data points in the clusters correspond to individual ones of specific malwares.

An additional exemplary embodiment a computer program product comprising a computer readable storage medium having program instructions embodied therewith. The program instructions are executable by a computer system to cause the computer system to perform operations comprising: extracting by the computer system features of documents that mention malware programs to determine textual features that correspond to individual ones of the malware programs; performing by the computer system analysis of samples of malware programs to determine features corresponding to the samples; performing by the computer system clustering using the textual features and using the features that correspond to the samples of the malware programs, the clustering creating clusters of data points, each data point corresponding to an individual one of the malware programs, and the clusters containing data points considered by the clustering to be similar; and outputting by the computer system indications of the clusters to allow determination of whether data points in the clusters correspond to individual ones of specific malwares.

DETAILED DESCRIPTION

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

As described above, there are issues for current clustering techniques for malware. The inventors have realized that many of the fundamental limitations of the traditional approaches can be resolved with inputs from malware analysts, who perform a fine-grained and extensive malware analysis of given malware samples and families. For instance, the malware analysts will usually perform very fine-grained manual debugging (e.g., flipping branch condition, which ensures multiple/all branches are taken), and de-obfuscation and unpacking based on various tools. Then, they may conclude and document that two malware samples with different packing mechanisms are actually the same malware. Their knowledge can bridge the missing information to link malware samples with different traditional feature values such as different obfuscation methods.

We propose an approach to improve the accuracy of the malware clustering by incorporating information from textual descriptions such as the technical descriptions provided by the malware analysts as previously described. For each malware, one approach first extracts textual features from security documents. Then, we cluster malware with both the textual features and the traditional features from static/dynamic malware analysis. This approach can improve the accuracy of the malware clustering by identifying documented human knowledge about malware that can be difficult to extract from the existing static/dynamic analysis. In particular, the combination of textual features with traditional malware analysis features (static/dynamic features) helps improve the accuracy of the malware clustering tasks.

Figure 1A:
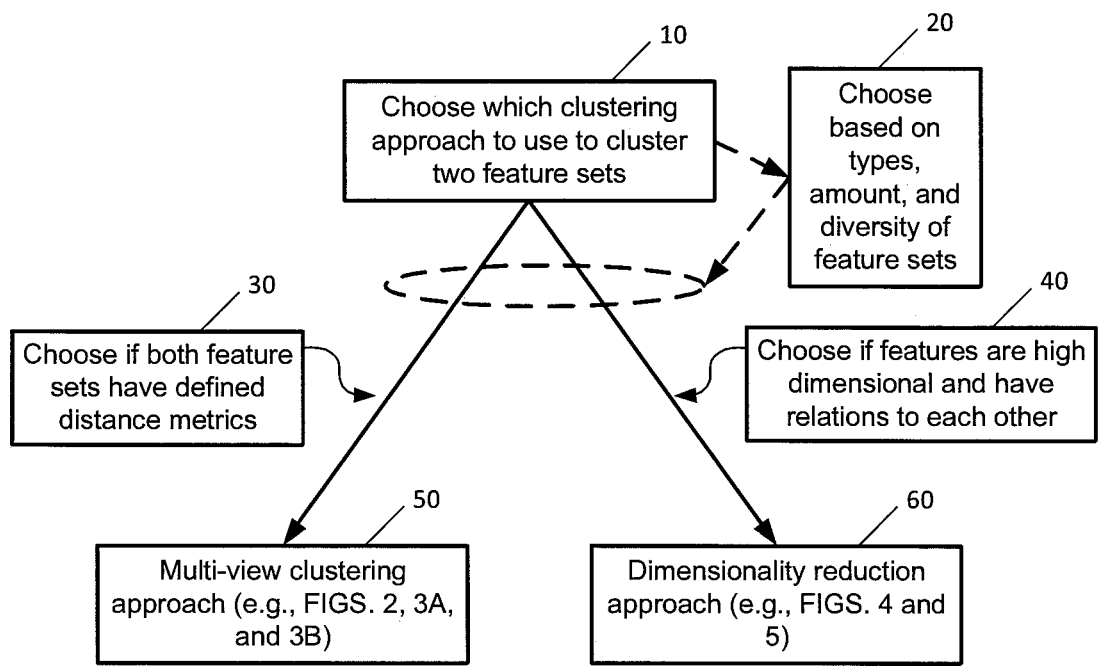
FIG. 1A is a block diagram of flowchart of a method for choosing a malware clustering approach, and illustrates the operation of an exemplary method or methods, a result of execution of computer program instructions embodied on a computer readable memory, functions performed by logic implemented in hardware, and/or interconnected means for performing functions in accordance with exemplary embodiments.

Turning to FIG. 1A, this figure is a block diagram of flowchart of a method for choosing a malware clustering approach. There are two sets of features, which are textual features extracted from malware documents, and features extracted from static analysis, dynamic analysis, or both static and dynamic analysis of malware samples. There are two different methods to leverage the two sets of features. One may choose between the two different methods (block 10). A security analyst may perform block 10. Firstly, one can apply a multi-view clustering approach (block 50) that considers the two sets separately. This approach allows one to leverage similarity information from both feature sets. This approach is described in reference to FIGS. 2, 3A, and 3B. Secondly, one can map these features onto the same space using a dimensionality reduction technique and apply a clustering method. This is the dimensionality reduction clustering approach of block 60. This approach enables us to combine and consider the criteria of the two feature sets together. As an example, we can use a multimodal autoencoder to map them into the same space. This approach is described in reference to FIGS. 4 and 5.

The choice of a method depends on, e.g., the types of feature sets, the amount of features in the feature sets, and the diversity of the feature sets. See block 20. Usually, categorical data can be more easily processed with a neural network than matrix-based multi-view clustering. Also, having many features makes the choice of distance measure, or mapping into a matrix form of the matrix-based multi-view clustering, a little difficult. But if we have only succinct set of features, manual feature engineering is possible and also can be more effective. If both feature sets have defined distance metrics, e.g., defined by security experts, one may choose (block 30) multi-view clustering with the metrics. If the features are high dimensional, and have relations to each other, one can choose (block 40) application of a dimensionality reduction method to map them into the same space using their redundancy. See block 50. As one example, dimensionality higher than 50 can be high dimensional. This number really depends on application, but once manual engineering of features gets difficult, it is considered high dimensional. People often use hundreds or thousands of dimensions, as high dimensional features.

Regarding features having relations with each other, a relation is a relationship between features, just like duplication. Two features may be duplications (e.g., number of privileges versus number of resources malware can access). Or, if one feature has a high value, another may have a low value. For instance, the number of privileges malware has as compared to if the malware can access user account information. In this case, they are not exact duplication—which is the typical case but instead are related. If we have a list of resources to which a malware has an access, we can actually compute the number of privileges it has.

That is, we do not measure their similarity directly, but instead, we find a combined representation, that two features are mapped to the same dimension using correlation. To illustrate, whenever "Malicious" is found, say we set the first dimension of the representation as 1, and say for feature X among static features is set to True whenever the first dimension of the representation is 1. Then, we do not need to use another dimension in the representation to consider X, as it correlates the first dimension already, and we can fully reconstruct this X based on the first dimension value.

As another example, about measuring similarity between features, in particular how one feature among textual features and another feature among static/dynamic features are similar (e.g., so they are heterogeneous), and thus combine them into one in dimensionality reduction (e.g., a multi-modal autoencoder case as described below), the optimization goal of the autoencoder is to reconstruct the input features with a low dimensionality of internal representation vectors. During this optimization, features with high correlations are identified and internally represented by a similar set of dimensions in order to reduce the number of dimensions used.

Figure 1B:
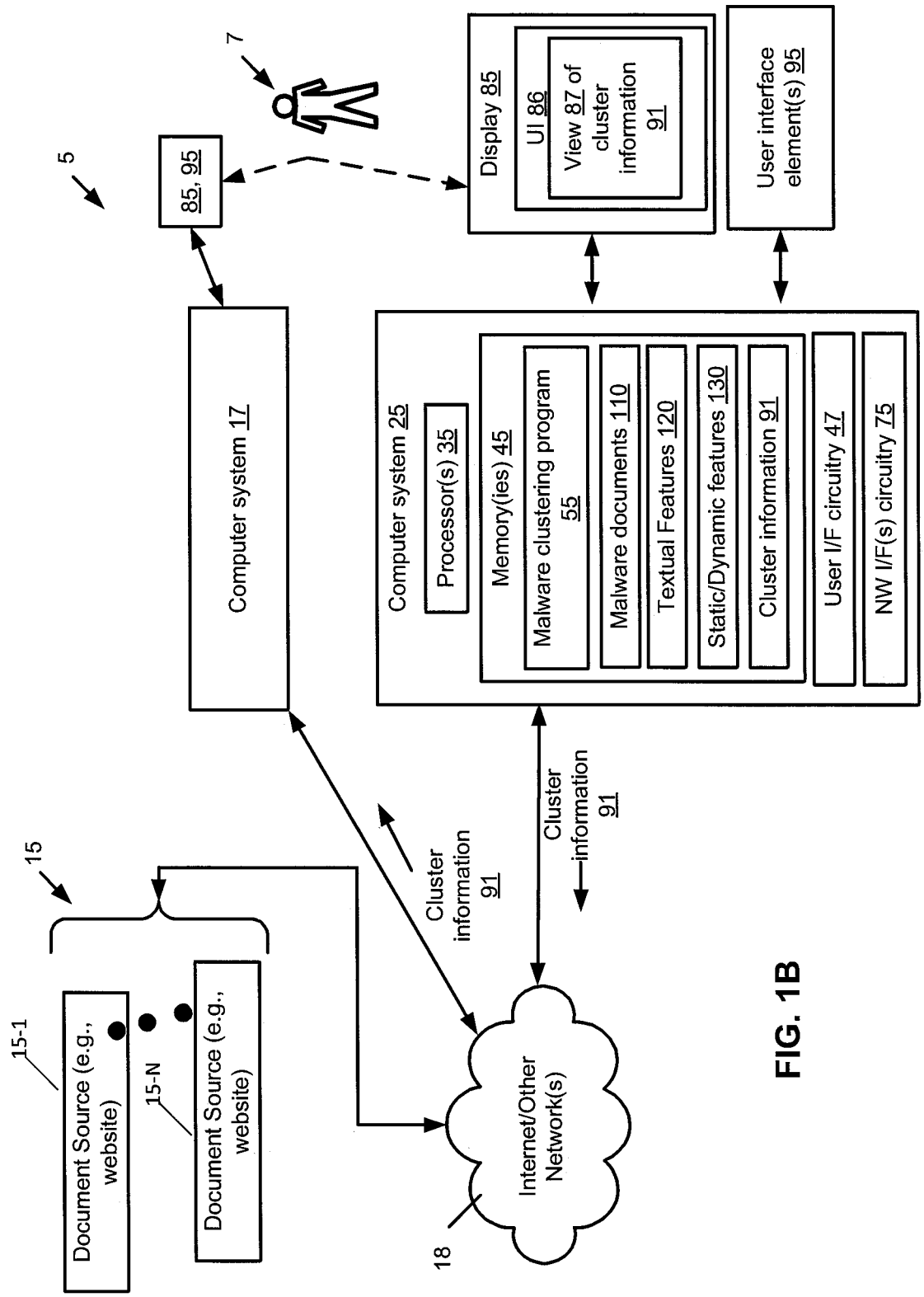
FIG. 1B is a block diagram of one exemplary system able to perform the techniques described in the exemplary embodiments herein.

Referring to FIG. 1B, this figure is a block diagram of one exemplary system 5 able to perform the techniques described in the exemplary embodiments herein. The system 5 comprises one or both of the computer systems 17 and 25. The internal aspects of the computer systems 17 and 25 are assumed to be similar and therefore only the computer system 25 is illustrated in more detail. The computer system 25 comprises one or more processors 35, one or more memories 45, user interface (I/F) circuitry 47, and network (NW) interface(s) circuitry 75. The one or more memories 45 comprise a malware clustering program 55, which is in an exemplary embodiment computer readable code that, when loaded into and executed by the one or more processors 35, causes the computer system 25 to perform operations described herein. For instance, the operations in the blocks 50 and 60 of FIG. 1A may be performed by the computer system 25. The malware clustering program 55 could also be designed in part or whole as hardware, e.g., as part of the circuitry for the one or more processors 35. The one or more memories 45 also comprise malware documents 110, textual features 120, static/dynamic features 130, and cluster information 91.

A brief overview of an exemplary method is now provided in reference to FIG. 1B. In order to perform blocks 50 and 60 of FIG. 1A, the computer system 25 (e.g., under control of the malware clustering program 55) may find malware documents 110, e.g., by using the user I/F circuitry 47 to retrieve documents 110 from the document sources 15 via the Internet 18 and/or other network(s) 18. The user I/F circuitry may support wired communications, wireless communications, or both types of communication. Document sources 15-1 through 15-N are shown and these may be websites or other sources of information (e.g., cloud storage facilities, encrypted depositories, personal servers, and the like). Examples of the types of documents 110 that might be found and retrieved are described below. Note that the malware documents 110 might also be provided to the computer system 25, in lieu of or in addition to searching the document sources 15.

The malware clustering program 55 causes the computer system 25 to find and extract the textual features 120 from the malware documents 110. The features 130 are typical features used for malware determined using static analysis, dynamic analysis, or both static and dynamic analysis. The malware clustering program 55 causes the computer system 25 to perform one or both of blocks 50 and 60 in FIG. 1A, to create cluster information 91 as an output (or outputs).

In an exemplary embodiment, a security analyst 7 may interact with the computer system 25 using the user interface elements 95 (such as a mouse and keyboard) and via the user I/F circuitry 47 and the malware clustering program 55 to, e.g., examine a view 87 of the cluster information 91 on a user interface (UI) 86 on the display 85. The security analyst 7 is a human being and a user of the computer system 25. In another exemplary embodiment, the system analyst 7 uses the computer system 17 (e.g., as a "client") to access the computer system 25 (e.g., as a "server") and examines a view 87 of the cluster information 91 on the UI 86 on the display 85. The computer system 25 performs the operations as previously described, but sends the cluster information 91 to the computer system 17 for display to the system analyst 7.

Figure 2:
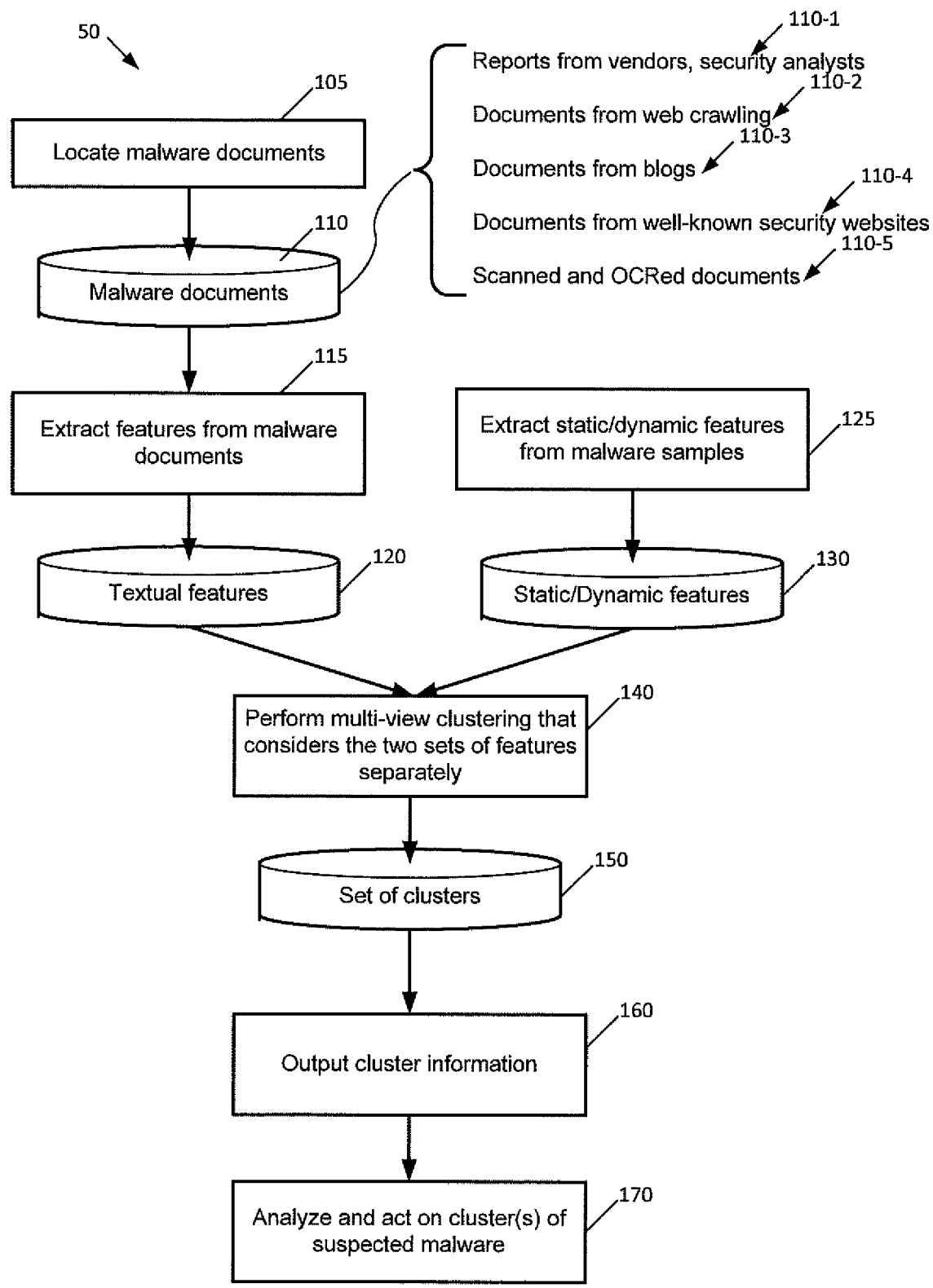
FIG. 2 is a block diagram of a flowchart of a method for performing a multi-view clustering approach based on cognitive computing techniques.

The multi-view clustering approach (block 50) is described in reference to FIGS. 2, 3A, 3B, and 4. Turning to FIG. 2, this figure is a block diagram of a flowchart of a method for performing a multi-view clustering approach based on cognitive computing techniques. This figure illustrates the operation of an exemplary method or methods, a result of execution of computer program instructions embodied on a computer readable memory, functions performed by logic implemented in hardware, and/or interconnected means for performing functions in accordance with exemplary embodiments. It is assumed the operations in most of the blocks in this figure are performed by the computer system 25 under control of the malware clustering program 55. In block 105, the computer system 25 locates malware documents 110, e.g., by trawling the Internet 18 and examining documents 110 at document sources 15. Additionally or alternatively, the documents 110 may also be provided to the computer system 25, and the computer system would locate these in the one or more memories 45. Examples of such malware documents 110 include one or more of the following examples: 110-1, reports from vendors, security analysts; 110-2, documents from web crawling; 110-3, documents from blogs; 110-4, documents from well-known security websites (e.g., security websites known in the industry); 110-5, scanned and OCRed documents (e.g., documents that have been scanned and passed through optical character recognition). Note that security analysts also may be referred to as security experts.

After the malware documents 110 have been located, the computer system 25 in block 115 extracts features from the malware documents 110 to create textual features 120. It is noted that block 115 typically involves analyzing thousands of documents, e.g., on a daily basis. The granularity and representation of the features 120 can be (bag of) words or relations. That is, cognitive analysis is performed in block 115 on security documents concerning malware samples, and this analysis may include one or more of bag of words, topic model, word embedding, and many other machine learning methods. We can also apply representation methods such as word2vec and similar relation mining to obtain denser feature vectors for each malware. For word2vec, see Tomas Mikolov et al., "Efficient Estimation of Word Representations in Vector Space", arXiv:1301.3781v3 [cs.CL] 7 Sep. 2013, and the code for word2vec referenced therein. Briefly, word2vec is a group of related models that are used to produce word embeddings. It optimizes a word embedding (also known as word representation, word vector) to predict its surrounding words. These word embeddings are known to learn semantic features that can be used to measure semantic similarity. It is also noted that it is possible to use MD5, which is a semi-unique name for any programs or files based on their contents, regardless of its surface name, like "this_is_malware.exe" and "install.exe". The use of MD 5 will help to find that a description is for a certain malware (and thus for malware samples).

As stated above, the features 130 are typical features used for malware determined using static analysis, dynamic analysis, or both static and dynamic analysis. The features 130 may be provided to the computer system 25 and located in the one or more memories 45. Alternatively or in addition, the computer system 25 could extract (block 125) the static/dynamic features using static analysis, dynamic analysis, or both static and dynamic analysis on samples of malware programs. Such samples are software programs that may be malware and that may be specific malware programs (such as Ghost Push), or variants of specific malware programs. Ghost Push is a malware family that exploits vulnerabilities to gain root access to Android devices (running the Android operating system) to then download and possibly review other apps in the background. The techniques for performing the extraction for static analysis and dynamic analysis are known to those skilled in this area. For the static and dynamic features, it should be noted, there are many approaches to measure the similarity of them, e.g., one can encode a sequence of dynamic system events or static operation code event into a feature set and then perform similarity measurements among a set of malware and check if most of the features are shared among these samples.

In block 140, the computer system 25 uses the textual features 120 and the static/dynamic features 130 and performs multi-view clustering that considers the two sets 120, 130 of features separately. This approach allows one to leverage similarity information from both feature sets. As previously described, this approach is typically used if both feature sets 120, 130 have defined distance metrics, e.g., defined by security experts. In particular, distance functions may be used as the distance metrics. It is noted that block 140 involves a series of very large matrix computations. The output of block 140 is a set of clusters 150, e.g., described by many vectors. In block 160, cluster information 91 that describes the set of clusters 150 is output. The output may be to a memory inside a computer system 25, to a display 85, and/or over a network. The cluster information 91 comprises a set of clusters, each of which allows determination of whether data points in a cluster corresponds to an individual one of a specific malware. This specific malware is known, such as being "Ghost Push" or other known malware. Each cluster contains, e.g., one to multiple to many data points, and each of these may be a variant of a malware program.

In block 170, it is possible to analyze and act on the cluster(s) of suspected malware. A security analyst 7 may take steps to isolate the malware or perform other actions with regard to the malware. The analysis result (e.g., one of the clusters) can be used to identify a similar malware application (or applications) to an existing (e.g., known malware), so that we can apply a similar or same technique to prevent the operation of or remove the malware program, including the variants corresponding to data points in the cluster. This may be performed by an analyst or by a computer system (or both).

Figure 3B:
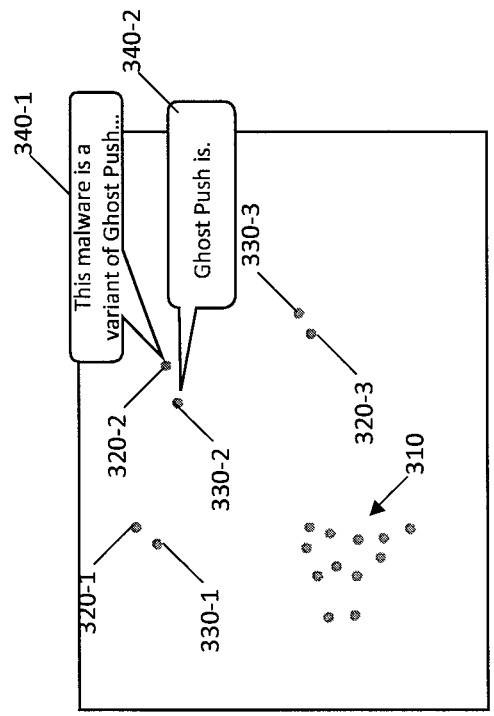
FIG. 3B is an illustration of feature vectors in a vector space for a view for cognitive textual analysis on security documents on malware samples.
Figure 3A:
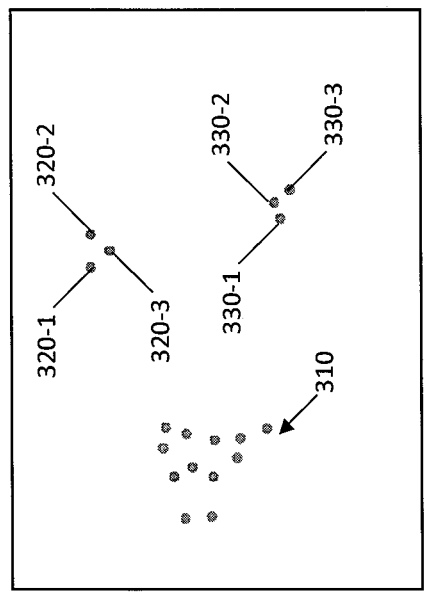
FIG. 3A is an illustration of feature vectors in a vector space for a view for static/dynamic analysis on malware samples.

Referring to FIGS. 3A and 3B, FIG. 3A is an illustration of feature vectors in a vector space for a view for static/dynamic analysis on malware samples, and FIG. 3B is an illustration of feature vectors in a vector space for a view for cognitive textual analysis on security documents on malware samples. Basically, these views are illustrations of how feature vectors might be represented in their corresponding vector spaces. In FIG. 3A, there are three groups 310, 320, and 330, and each group has a point indicating a vector corresponding to a malware sample (e.g., a piece of software that is possibly a malware). The group 320 has vectors 320-1, 320-2, and 320-1. Similarly, the group 330 has vectors 330-1, 330-2, and 330-1. The view in FIG. 3B, using a different set of feature vectors for each malware, has a similar group 310. The vectors 320-1 and 330-1 are close together in this vector space, as are the vectors 320-2 and 330-2 and also 320-3 and 330-3. The vector space for FIG. 3B uses textual feature vectors (as compared to the static/dynamic feature vectors in FIG. 3A). The text from the document 110 that allows the feature vector 320-2 to be determined includes the text of "This malware is a variant of Ghost Push . . . ", illustrated in the text bubble 340-1. The text from the document 110 that allows the feature vector 330-2 to be determined includes the text of "Ghost Push is . . . ", illustrated in the text bubble 340-2. FIGS. 3A and 3B therefore have different views of vectors for the malware illustrated by the feature vectors in these figures, and FIG. 3B shows that the feature vectors for malware similar to a Ghost Push variant are near to each other in the vector space in FIG. 3B (e.g., meaning they are likely related based on the distance), but are not near each other in the vector space in FIG. 3A (e.g., meaning they are likely unrelated based on the distance). This illustrates that the textual feature vectors derived from documents 110 by security experts can help in the clustering of malware. Note that FIGS. 3A and 3B are illustrations corresponding to the inputs of the static/dynamic features 130 and the textual features 120, respectively. Note also that the same numbers are used in both FIGS. 3A and 3B, but the actual features in the feature vectors for these figures may be different.

There are many techniques for performing multi-view clustering. One such technique is described in Jialu Liu, et al., "Multi-View Clustering via Joint Nonnegative Matrix Factorization", Proc. of 2013 SIAM Data Mining Conf. (SDM'13), Austin, Tex., May 2013, which uses joint non-negative matrix factorization to perform multi-view clustering. Note that the Jialu Liu reference additionally cites other references have techniques for multi-view clustering. See also Steffen Bickel and Tobias Scheffer, "Multi-View Clustering", Proceedings of the IEEE International Conference on Data Mining (2004). Other techniques may also be used. For instance, we can apply multi-view clustering algorithms including joint nonnegative matrix factorization (e.g., as in Jialu Liu, et al.), correlation analysis, multi-view DBSCAN (density-based spatial clustering), and multi-view expectation maximization algorithms. Regarding multi-view clustering, the Jialu Liu reference states the following (internal references omitted): "As unlabeled data are plentiful in real life and increasing quantities of them come in multiple views from diverse sources, the problem of unsupervised learning from multiple views of unlabeled data has attracted attention, referred to as multi-view clustering. The goal of multi-view clustering is to partition objects into clusters based on multiple representations of the object." It is noted the two views are treated separately, that is multi-view clustering applies clustering individually on each feature space.

Figure 4:
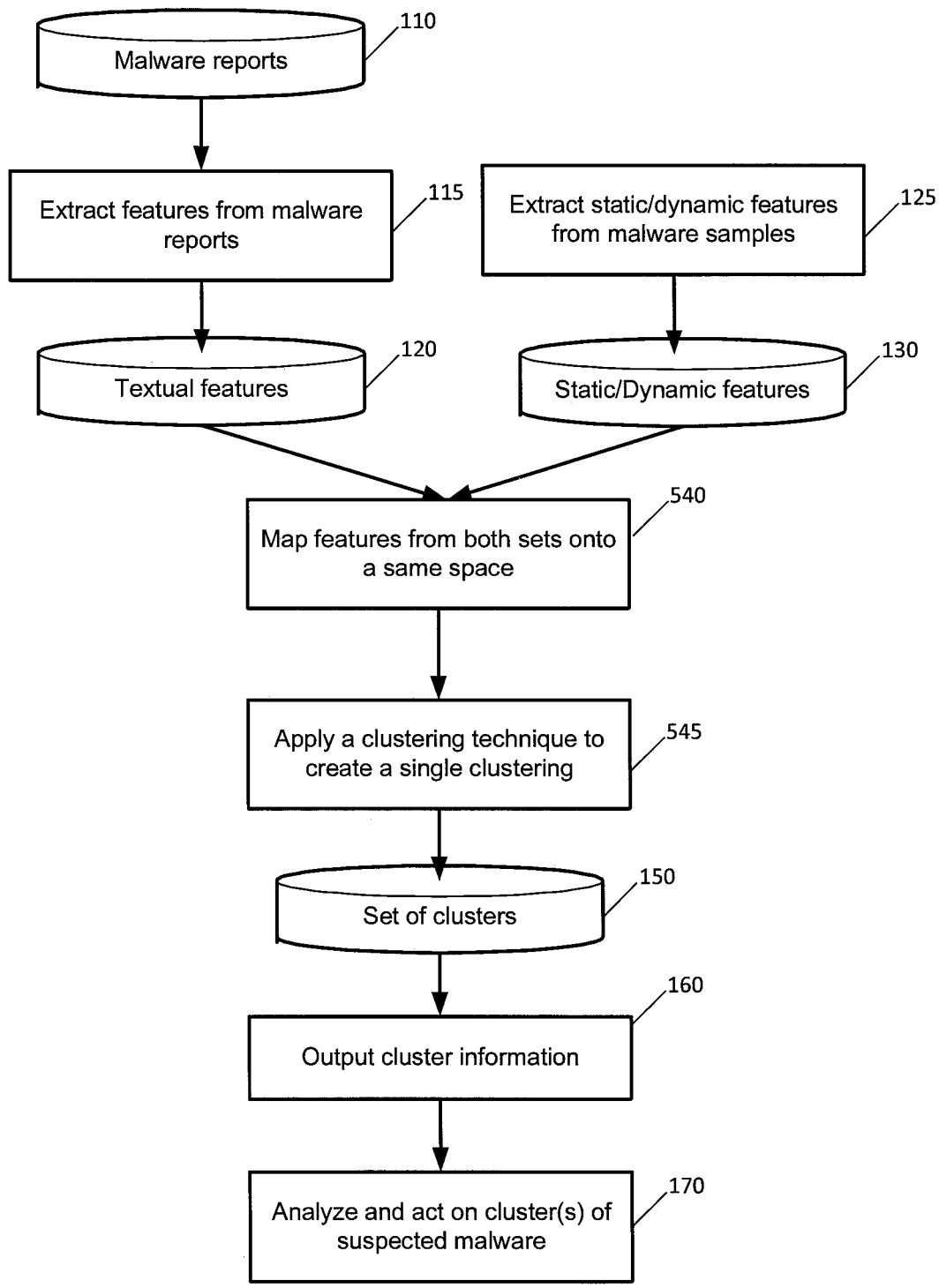
FIG. 4 is a block diagram of a flowchart of a method for performing a dimensionality reduction clustering approach based on cognitive computing techniques.
Figure 5:
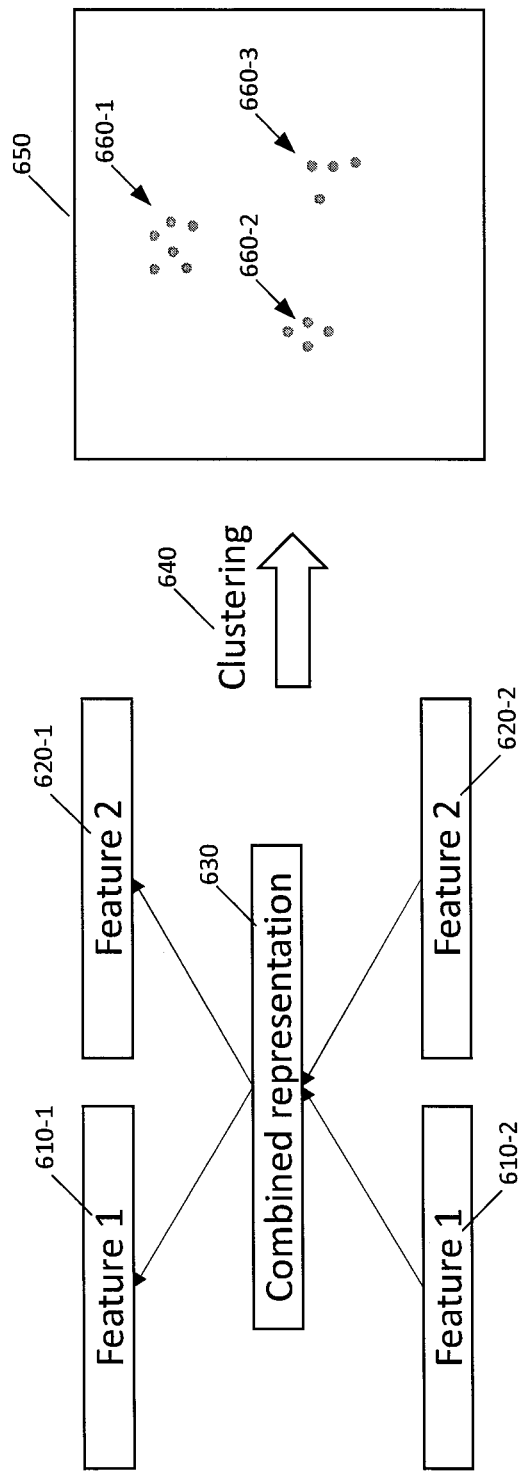
FIG. 5 is an example of a multimodal auto encoder used for the dimensionality reduction clustering approach of FIG. 4.

An exemplary dimensionality reduction clustering approach of block 60 is described in reference to FIGS. 4 and 5. Turning to FIG. 4, this figure is a block diagram of a flowchart of a method for performing a dimensionality reduction clustering approach based on cognitive computing techniques. This figure illustrates the operation of an exemplary method or methods, a result of execution of computer program instructions embodied on a computer readable memory, functions performed by logic implemented in hardware, and/or interconnected means for performing functions in accordance with exemplary embodiments. Most of the blocks in FIG. 4 are assumed to be performed by the computer system 25 under the control of the malware clustering program 55. The blocks 110, 115, 120, 130, 150, 160, and 170 have been previously described and therefore will not be discussed at this point.

The dimensionality reduction clustering approach comprises the blocks 540 and 545. It was previously described above that this technique could be used if the features are high dimensional, and have relations to each other. The features can then have applied to them a dimensionality reduction method to map them into the same space using their redundancy. In accordance with this, in block 540, the computer system 25 maps features from both sets onto a same space. It is noted that block 540 involves a series of very large matrix computations. In block 545, the computer system 25 applies a clustering technique to the vectors in that space to create a single clustering.

One technique for performing blocks 540 and 545 is by using a multimodal autoencoder, which uses deep learning for combined representation of the features. With respect to an example of a multimodal autoencoder, see Ngiam, Jiquan, et al. "Multimodal deep learning", Proceedings of the 28th International Conference on Machine Learning (ICML-11). 2011. FIG. 5 is an exemplary illustration of this. In this example, the features 610-1 and 610-2, shown as "Feature 1" are static/dynamic analysis features 130. The features 620-1 and 620-2, shown as "Feature 2" are textual features from documents 110 on malware samples. The textual features, as described above, may be extracted using bag of words, topic model, word embedding, and many other machine learning methods. The combined representation 630 is a large set of parameters that will be optimized to best "reproduce" the input Features 1 and 2. Since the size of the parameter set is smaller than the two inputs, the process removes duplications, and combines related features to keep more succinct values only. For example, if some feature x of Feature 1 610-2 is one (1) whenever feature y of Feature 2 620-2 is one (1), then the optimization (e.g., blocks 540 and 545) combines them into one, and we can still perfectly reproduce features 610-2 and 620-2 (which are features 610-1 and 620-2 respectively). The clustering 640 is an illustration of the clustering in block 545. The vector space 650 illustrates the result (the cluster information 91), which has three groups 660-1, 660-2, and 660-3. Each of the groups corresponds to sets of feature vectors that are most likely related based on distance between the vectors in the groups. That is, each feature vector (or point in 650) corresponds to a malware, and a group 660 (also called a cluster) of points/feature vectors/malware is a set of similar malware, which a security analyst would further inspect to see if he or she can apply the same techniques to prevent/remove them (or use in other purposes like selecting an analysis method, and the like).

As has been described in our approach, we leverage cognitive computing power to analyze documents such as malware reports and web documents, which are summarized and written by malware analysts after their fine-grained malware analysis. We then extract textual features from these documents. The granularity and representation of the features can be either (bag of) words, or relations. We may also apply representation methods such as word2vec and similar relation mining to obtain denser feature vectors for each malware. The textual features are combined with "traditional" features using static analysis, dynamic analysis, or both analyses, using two different suggested techniques. This approach can improve the accuracy of the malware clustering by identifying documented human knowledge about malware that can be difficult to extract from the existing static/dynamic analysis.

The following are examples. Example 1. A method, comprising:

extracting by a computer system features of documents that mention malware programs to determine textual features that correspond to individual ones of the malware programs;

performing by the computer system analysis of samples of malware programs to determine features corresponding to the samples;

performing by the computer system clustering using the textual features and using the features that correspond to the samples of the malware programs, the clustering creating clusters of data points, each data point corresponding to an individual one of the malware programs, and the clusters containing data points considered by the clustering to be similar; and outputting by the computer system indications of the clusters to allow determination of whether data points in the clusters correspond to individual ones of specific malwares.

Example 2

The method of example 1, wherein performing by the computer system analysis of samples of malware programs to determine features corresponding to the samples of malware programs further comprises performing static analysis, dynamic analysis, or both static and dynamic analyses of the samples.

Example 3

The method of example 2, wherein performing clustering further comprises performing multi-view clustering that considers separately the textual features and the features from static analysis, dynamic analysis, or both static and dynamic analyses of the second malware in order to create the clusters of data points.

Example 4

The method of example 3, further comprising using one of joint nonnegative matrix factorization, a correlation analysis, a multi-view density-based spatial clustering, or a multi-view expectation maximization algorithm to perform the multi-view clustering.

Example 5

The method of example 2, wherein performing clustering further comprises:

mapping features from both the textual features and the features from static analysis, dynamic analysis, or both static and dynamic analyses of the second malware onto a same space; and applying a clustering technique to the mapped features in the space to create a single clustering comprising the clusters.

Example 6

The method of example 5, further comprising using a multimodal autoencoder to perform the mapping features from both the textual features and the features from static analysis, dynamic analysis, or both static and dynamic analyses of the second malware onto the same space and to perform the applying the clustering technique to the mapped features in the space to create the single clustering.

Example 7

The method of example 1, wherein extracting features of documents that mention malware programs to determine textual features that correspond to individual ones of the malware programs further comprises performing the extracting using one or more of the following: bag of words method, a topic model, word embedding, another machine learning method, or a representation method.

Example 8

The method of example 1, wherein the documents comprise one or more of the following: reports from vendors or security analysts; documents from web crawling; documents from blogs; documents from well-known security websites; and documents that have been scanned and passed through optical character recognition.

Example 9

The method of example 1, wherein outputting comprises outputting to a display the indications of the clusters to allow the determination by a user looking at the display of whether the data points in a selected one of the clusters correspond to a specific malware.

Example 10

The method of example 9, wherein the specific malware is a known malware program.

Example 11

The method of example 1, further comprising using the indications of the clusters to identify one or more malware programs similar to a specific malware, and applying one or more techniques to prevent the operation of or remove the one or more malware programs that are similar to the specific malware.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method, comprising:
    for documents that comprise text and the text describes malware programs, extracting by a computer system textual features from descriptions in the text of the malware programs, wherein the textual features correspond to individual ones of the malware programs and link the descriptions to the individual ones of the malware programs;
    performing by the computer system analysis of samples of malware programs to determine malware analysis features corresponding to the samples, the performing analysis of samples comprising performing static analysis, dynamic analysis, or both static and dynamic analyses of the samples;
    performing by the computer system clustering using the textual features and using the malware analysis features, the clustering combining the textual features and malware analysis features to create clusters of data points, a data point corresponding to an individual one of the malware programs, wherein the clustering identifies documented human knowledge about the malware programs and uses one or more similarity metrics to form clusters for specific malware programs, inclusion in a cluster indicates correspondence with a specific malware program and inclusion is based at least on the one or more similarity metrics, and wherein performing clustering comprises:
        mapping features from both the textual features and the malware analysis features from static analysis, dynamic analysis, or both static and dynamic analyses of the samples onto a same space; and
        applying a clustering technique, using at least the one or more similarity metrics, to the mapped features in the space to create a single clustering comprising the clusters; and
    outputting by the computer system indications of the clusters to allow determination of whether data points in the clusters correspond to individual ones of the specific malware programs.

2. The method of claim 1, wherein extracting textual features further comprises performing the extracting using one or more of the following: bag of words method, a topic model, word embedding, another machine learning method, or a representation method.

3. The method of claim 1, wherein the documents comprise one or more of the following: reports from vendors or security analysts; documents from web crawling; documents from blogs; documents from well-known security websites; or documents that have been scanned and passed through optical character recognition.

4. A computer system, comprising:
    one or more memories storing computer-readable code;
    one or more processors, wherein the one or more processors, in response to retrieval and execution of the computer-readable code, cause the computer system to perform operations comprising:
    for documents that comprise text and the text describes malware programs, extracting by the computer system textual features from descriptions in the text of the malware programs, wherein the textual features correspond to individual ones of the malware programs and link the descriptions to the individual ones of the malware programs;
    performing by the computer system analysis of samples of malware programs to determine malware analysis features corresponding to the samples, the performing analysis of samples comprising performing static analysis, dynamic analysis, or both static and dynamic analyses of the samples;
    performing by the computer system clustering using the textual features and using the malware analysis features, the clustering combining the textual features and malware analysis features to create creating clusters of data points, a data point corresponding to an individual one of the malware programs, wherein the clustering identifies documented human knowledge about the malware programs and uses one or more similarity metrics to form clusters for specific malware programs, wherein inclusion in a cluster indicates correspondence with a specific malware program and inclusion is based at least on the one or more similarity metrics, and wherein performing clustering comprises:
        mapping features from both the textual features and the malware analysis features from static analysis, dynamic analysis, or both static and dynamic analyses of the samples onto a same space; and
        applying a clustering technique, using at least the one or more similarity metrics, to the mapped features in the space to create a single clustering comprising the clusters; and
    outputting by the computer system indications of the clusters to allow determination of whether data points in the clusters correspond to individual ones of the specific malware programs.

5. The computer system of claim 4, wherein extracting features further comprises performing the extracting using one or more of the following: bag of words method, a topic model, word embedding, another machine learning method, or a representation method.

6. The computer system of claim 4, wherein the documents comprise one or more of the following: reports from vendors or security analysts; documents from web crawling; documents from blogs; documents from well-known security websites; or documents that have been scanned and passed through optical character recognition.

7. A computer program product comprising a computer readable storage medium having program instructions embodied therewith, the program instructions executable by a computer system to cause the computer system to perform operations comprising:

for documents that comprise text and the text describes malware programs, extracting by the computer system textual features from descriptions in the text of the malware programs, wherein the textual features correspond to individual ones of the malware programs and link the descriptions to the individual ones of the malware programs;

performing by the computer system analysis of samples of malware programs to determine malware analysis features corresponding to the samples, the performing analysis of samples comprising performing static analysis, dynamic analysis, or both static and dynamic analyses of the samples;

performing by the computer system clustering using the textual features and using the malware analysis features, the clustering combining the textual features and malware analysis features to create creating clusters of data points, a data point corresponding to an individual one of the malware programs, wherein the clustering identifies documented human knowledge about the malware programs and uses one or more similarity metrics to form clusters for specific malware programs, wherein inclusion in a cluster indicates correspondence with a specific malware program and inclusion is based at least on the one or more similarity metrics, and wherein performing clustering comprises:

mapping features from both the textual features and the malware analysis features from static analysis, dynamic analysis, or both static and dynamic analyses of the samples onto a same space; and applying a clustering technique, using at least the one or more similarity metrics, to the mapped features in the space to create a single clustering comprising the clusters; and outputting by the computer system indications of the clusters to allow determination of whether data points in the clusters correspond to individual ones of the specific malware programs.

8. The computer program product of claim 7, wherein extracting textual features further comprises performing the extracting using one or more of the following: bag of words method, a topic model, word embedding, another machine learning method, or a representation method.

9. The computer program product of claim 7, wherein the documents comprise one or more of the following: reports from vendors or security analysts; documents from web crawling; documents from blogs; documents from well-known security websites; or documents that have been scanned and passed through optical character recognition.

10. The method of claim 1, further comprising applying one or more techniques to prevent the operation of or remove the one or more malware programs that are similar to the specific malware.

11. The method of claim 1, wherein one or more of the documents are security documents written by security experts.

* * * * *